G. W. SELL.
RESILIENT TIRE FOR AUTOMOBILE TRUCKS.
APPLICATION FILED APR. 26, 1920.
1,368,200.
Patented Feb. 8, 1921.
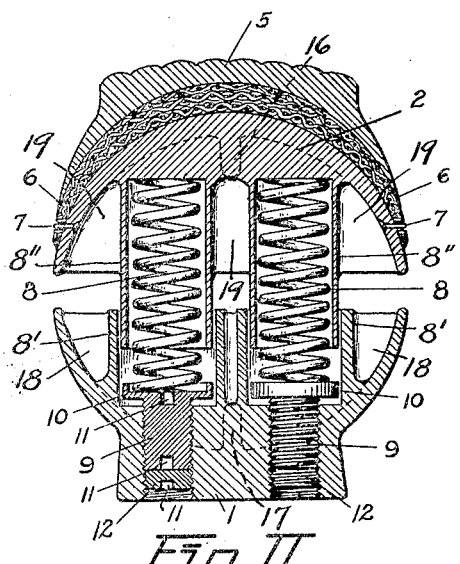
Fig. II
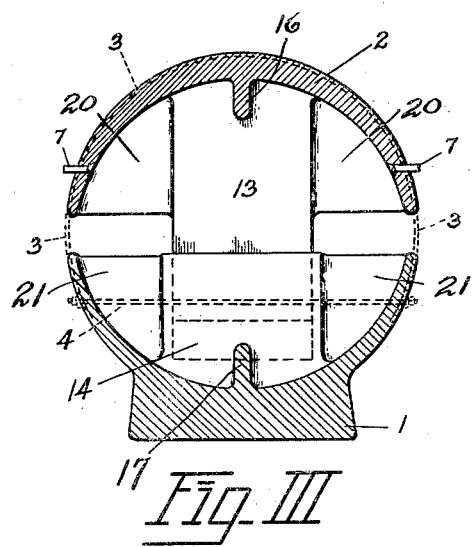
Fig. III
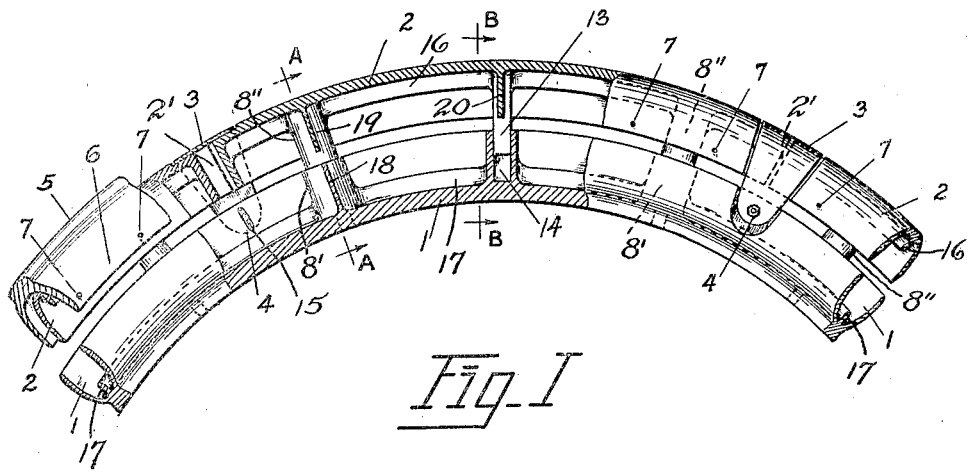
Fig. I
WITNESS
INVENTOR
G.W. Sell.
BY
ATTORNEYS

UNITED STATES PATENT OFFICE.

GEORGE W. SELL, OF PORTLAND, OREGON.

RESILIENT TIRE FOR AUTOMOBILE-TRUCKS.

1,368,200.  Specification of Letters Patent.  Patented Feb. 8, 1921.

Application filed April 26, 1920. Serial No. 376,536.

*To all whom it may concern:*

Be it known that I, GEORGE W. SELL, a citizen of the United States, residing at Portland, in the county of Multnomah and State of Oregon, have invented a new and useful Resilient Tire for Automobile-Trucks, of which the following is a specification.

My invention relates to improvements in resilient tires for automobile trucks in which the tread portion alone is covered by a narrow band of rubber, and in which resiliency is furnished by a mechanical construction including radially disposed helical springs set in pairs side by side.

The objects of my invention are: to reduce the use of rubber to a minimum, and to produce a strong tire well adapted to the rough usage of automobile trucks.

Other objects and advantages consist in the general arrangement of parts and the details of construction as will be described hereafter.

I attain these objects with the mechanism illustrated in the accompanying drawing, in which—

Figure I is a portion of my tire in side elevation showing it partly covered with rubber, partly without rubber and partly in section.

Fig. II is a section through Fig. I along the line A—A, mainly to show the arrangement of the helical springs, and also to show the application of the rubber band, which hereafter may be referred to as a casing.

Fig. III is a section through Fig. I along the line B—B illustrating the construction of the lug which is intended to take care of lateral and tangential strains. Incidentally the same section is used to show the application of the steel clip to the tire.

Similar numerals refer to similar parts throughout the several views.

The base portion 1 is an integral ring, somewhat crescent-shaped in cross section, and may be placed into a demountable split rim similar to the rubber tires at present in vogue, or else cast solid with spokes and hub and represent the felly of a wheel. The tread portion 2 is also crescent-shaped in cross section and forms with the base portion a tubular structure, but said tread portion is built up of six or more sections, the ends of which join at 2' into each other with tongues and grooves. The steel clips 3 are employed to cover each joint and also to hold the sections to the base portion. For this purpose the steel clips are bolted to the base portion by means of the bolts 4 shown in Fig. III; it should, however, be noted that the steel clips are set in recesses in the tire structure, firstly to afford a smooth running surface, and secondly to make it impossible for pointed objects to wedge between the clips and the tire structure.

Noiseless running is assured by a rubber casing 5 whose wings 6 are hooked over the studs 7 in the tread portion 2.

Each section of the tread is equipped with four helical springs 8, set side by side in pairs as shown in Fig. II. Suitable sockets 8' and 8'' cast in the base and tread portion respectively guide said springs and protect them against disturbing influences from outside. The necessary tension to the springs can be given by the adjusting screws 9 whose heads 10 form an integral part of the screws 9 and serve as supports for the springs 8. On account of these heads the screws must be inserted in the base portion from the outside before the springs and the tread portions are mounted. The necessary adjustment can then be made from the inside of the wheel. Square holes 11 for the insertion of a key are provided. Screw plugs 12 prevent an accidental working loose of the adjusting screws 9.

Finally, to give greater security to the tread portion against shifting or tilting in lateral direction, a lug 13 is cast to every tread portion at the center thereof. This lug slides in a socket 14 in the base portion, so that creeping or tilting of the tread portion is entirely avoided, while resiliency is not disturbed.

It now only remains to designate by numerals some incidental details of construction. The slot 15 in Fig. I explains how the bolt 4 can move up and down under pressure on the clip 3. The ribs 16 and 17 strengthen the tread and base portions respectively. Ribs 18 reinforce the sockets 8' laterally, and ribs 19 do the same to the sockets 8''. Lateral reinforcing ribs for the lugs 13 and sockets 14 are indicated by the respective numerals 20 and 21.

I claim:

A resilient tire comprising an integral base portion, a tread portion in sections, metal clips to hold the tread portion to the base portion, recesses in the tire structure to receive the metal clips, bolts through the base portion to hold the metal clips, a casing hooked to the sides of the tread portion and covering said tread portion, helical springs side by side in pairs within the tire structure, and a radially disposed lug at the center of each tread section moving in a corresponding socket of the base portion, both elements contained within the tire structure.

Signed by me at Portland, Oregon, this 19th day of April, 1920.

GEORGE W. SELL.